United States Patent
Riesland

[11] 3,780,347
[45] Dec. 18, 1973

[54] POWER FACTOR CORRECTION IN A LEAD/LAG BALLAST CIRCUIT

[75] Inventor: David H. Riesland, Danville, Ill.

[73] Assignee: General Electric Company, Indianapolis, Ind.

[22] Filed: Sept. 27, 1972

[21] Appl. No.: 292,555

[52] U.S. Cl............... 317/9 PF, 315/232, 315/247, 315/255
[51] Int. Cl. ............................................. H02h 7/04
[58] Field of Search.................. 315/247, 255, 277, 315/232, 239; 317/9 PF, 14 R

[56] References Cited
UNITED STATES PATENTS
| | | | |
|---|---|---|---|
| 2,436,399 | 2/1948 | Nathanson | 315/247 X |
| 3,304,464 | 2/1967 | Feinberg | 315/232 X |
| 3,080,505 | 3/1963 | Eppert | 315/277 |
| 3,029,363 | 4/1962 | Mauerer | 315/239 X |

Primary Examiner—James D. Trammell
Attorney—John M. Stoudt et al.

[57] ABSTRACT

A ballast circuit which comprises an autotransformer and capacitors in a lead/lag circuit arrangement is provided to control current through at least a pair of gaseous discharge lamps. The lead circuit, which comprises a lead primary winding and a lead secondary winding connected to a power capacitor, controls a lead lamp. The lag circuit, which comprises a lag primary winding and a lag secondary winding, controls the current in a lag lamp. A shunt capacitor is connected across the series arrangement comprising the lead primary winding and the lead secondary winding. This shut capacitor provides additional power factor correction to above 90 percent power factor and is further used to tune the circuit for minimum impedance to a selected harmonic which is present in the lead circuit.

5 Claims, 4 Drawing Figures

PATENTED DEC 18 1973                                          3,780,347

POWER FACTOR CORRECTION IN A LEAD/LAG BALLAST CIRCUIT

BACKGROUND OF THE INVENTION

This invention relates to a ballast circuit with improved power factor correction.

In a ballast circuit involving inductors and capacitors power losses often occur because the voltage and the current lead and lag one another. In a purely inductive circuit, current is said to lag the voltage because current cannot instantaneously travel through the windings of the inductor. In a circuit involving a capacitor, the current is said to lead the voltage due to the charging of the capacitor and subsequent voltage increase. Power is defined as the voltage times the current times the cosine of the phase angle between the two; therefore, the greater the phase angle, the more the power loss. The cosine of the angle between the voltage and current, expressed as a percentage, is known as the power factor. In the ballast circuit art, it is sometimes very important to achieve a power factor of 90 percent or more. One important reason for a 90 percent power factor is that electric utilities charge a penalty when circuits operate at below 90 percent power factor.

Fluorescent lamp ballasts have much wider use than ballasts for mercury vapor or other high intensity discharge (HID) lamps. Ballast manufacturers normally manufacture magnetic cores for use in fluorescent ballast in large numbers by use of automated production techniques. This results in relatively low cost cores. Substantial savings can be made in manufacturing cost by utilizing a high volume fluorescent core in a low volume HID ballast. However, such an approach involves a number of difficulties.

Typically the largest high volume fluorescent ballasts are designed to operate 200 watt lamps while a typical HID lamp is 400 watts. Thus, the fluorescent ballast core designed for two 200 watt lamps has insufficient window area to accommodate the windings necessary to operate two 400 watt HID lamps from a similar source. Sufficient core window can be obtained by placing the lead primary and secondary windings on one core and the lag primary and secondary windings on a second core. If this is done the cumulative core size is larger than necessary and the total magnatizing current is larger than in an optimum design. This tends to lower the power factor of the circuit.

Also it is well known that, for any lead ballast circuit, whether fluorescent or HID, it is desirable to provide a slot in the core under the secondary winding to prevent excess flux density in the core when the associated lamp is conducting. When a slotted fluorescent core is used for a HID lead circuit, the slot size almost surely will not be an optimum for the HID application. This results in a lower power factor in the HID lead circuit. Thus, one result of utilizing the fluorescent cores for HID ballast is a lower than acceptable power factor.

One of the ways that a power factor was improved in prior art ballasts of the autotransformer type was to connect a capacitor across the input of the ballast. However, this approach requires a relatively large and expensive capacitor to obtain a relatively small power factor improvement. This disadvantage holds true in HID ballast using fluorescent cores. By way of example, in such a lead-lag ballast circuit to operate two 400 watt mercury lamps a 16 MFD capacitor is needed for a 4 percent improvement in power factor. Furthermore, this approach does not tune the circuit to take advantage of an harmonic normally introduced by the slotted core to raise the effective open circuit voltage of the lead circuit.

It also is known to place a power capacitor in series in the lead secondary circuit. However, such an approach in an HID ballast will not yield a 90 percent power factor and does not tune the circuit to take advantage of an available harmonics to raise the effective open circuit voltage.

In some high voltage ballasts a capacitor has been placed across only the lead secondary to tune the circuit for a selected harmonic. This raises the effective open circuit voltage and allows fewer secondary turns to be used. However, it does not substantially improve the power factor.

Thus, it is desirable to provide a ballast circuit which uses low cost, high volume cores in a low volume ballasts. Furthermore, it is desirable to use a small, inexpensive capacitor to obtain a power factor of at least 90 percent. Also it is desirable to tune the lead circuit to a selected harmonic so that fewer secondary turns may be utilized.

SUMMARY OF THE INVENTION

It is the general object of this invention to provide improved power factor correction in a lead-lag ballast circuit.

Another object of the invention is to provide such an improved ballast in which the lead circuit is tuned to a harmonic in order to increase the open circuit voltage of the lead circuit.

Still another object of the invention is to provide a power factor correction circuit in a lead-lag ballast circuit utilizing a small inexpensive capacitor.

In accordance with one form of this invention there is provided a lead-lag ballast circuit for controlling discharge lamps having power factor correction. The lead-lag ballast circuit is of the autotransformer-power capacitor type.

A lead primary winding and a lead secondary winding are wound in autotransformer relationship on a first magnetic core. There may be a slot in the core under the lead secondary winding, as is well known in the art. A lag primary winding and a lag secondary winding are wound in autotransformer relationship on a second magnetic core. The two primary windings are connected in electrical parallel. A power capacitor is connected in the lead circuit to ballast a lead lamp and provides some power factor correction. The lag secondary winding is connected to a lag lamp. The ballasting for the lag lamp is purely inductive. A shunt capacitor, connected across the lead primary winding and the lead secondary winding, provides additional power factor correction. Harmonics are introduced into the lead circuit because the lead transformer is wound on a slotted core. By placing the shunt capacitor across both the lead secondary winding and lead primary winding the lead circuit is tuned to one of these harmonics, thus increasing the open circuit voltage of the lead circuit. Because of the increase in this voltage the lead secondary may be built with a fewer number of turns resulting in materials saved. The capacitance of the shunt capacitor may be chosen to maximize power factor and to tune the circuit to a given odd harmonics.

BRIEF DESCRIPTION OF THE DRAWINGS

The subject matter of which I regard as my invention is set forth more particularly in the appended claims. The invention itself, however, together with further objects and advantages thereof may be better understood by referring to the following description taken in conjunction with the accompanying drawings in which:

DESCRIPTION OF THE PREFERRED EMBODIMENTS

Figure 1:
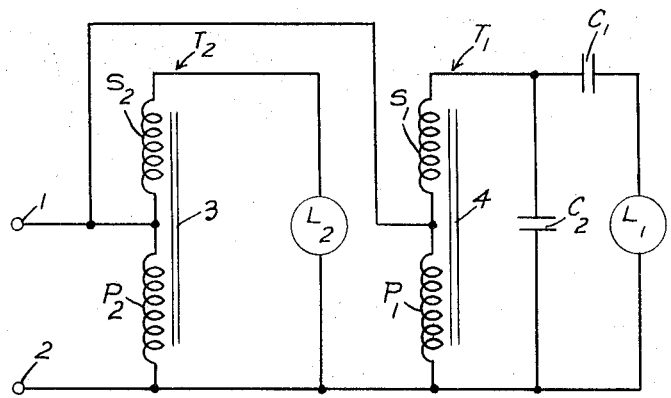
FIG. 1 is a schematic circuit diagram of one form of the improved ballast circuit.

Referring now to FIG. 1. The improved ballast circuit comprises a first autotransformer $T_1$ including lead primary winding $P_1$ connected to a lead secondary winding $S_1$, a second autotransformer $T_2$ including a lag primary winding $P_2$ connected to a lag secondary winding $S_2$. Autotransformer $T_1$ utilizes a slotted core 4 while autotransformer $T_2$ utilizes an unslotted core 3. Input leads 1 and 2 are connected across the lead and lag primary windings and receive an input voltage to energize the autotransformers. Lag lamp $L_2$ is connected across lag primary winding $P_2$ and lag secondary winding $S_2$ which provide starting voltage for lamp $L_2$. Lamp $L_2$ is ballasted by the lag secondary winding. Power capacitor $C_1$ is connected to the lead secondary winding $S_1$ and to lead gaseous discharge lamp $L_1$ to provide ballasting for the lamp and further to provide a power factor correction of less than 90 percent. Primary winding $P_1$ and secondary winding $S_1$ are connected across the series arrangement of lamp $L_1$ and capacitor $C_1$ and provides starting voltage for lamp $L_1$. Shunt capacitor $C_2$ is connected to the junction of the lead secondary $S_1$ and the power capacitor $C_1$ and to the lead primary winding $P_1$; that is, the shunt capacitor $C_2$ is connected across the lead primary $P_1$ and the lead secondary winding $S_1$. The shunt capacitor $C_2$ in combination with the power capacitor $C_1$ provides power factor correction of the ballast to above 90 percent power factor. By using a (4 mfd) shunt capacitor in a circuit having twin 400 watt mercury lamps a 93 percent power factor was obtained. Furthermore, by placing this shunt capacitor across the lead primary and secondary windings, the lead circuit was tuned to a selected odd harmonic, thereby increasing the open circuit voltage of the lead circuit. A sufficient voltage to start the lamp may still be attained even if the number of turns in the lead secondary winding is reduced, thereby resulting in a substantial savings in winding material.

A further cost reduction results because the capacitor used in this improved power factor correction circuit can be smaller and less expensive than the one used in the prior art, where a relatively large capacitor was placed across the lead primary winding, e.g. a 4 mfd capacitor is an example in the improved circuit as compared to 16 mfd in a prior art circuit to operate similar lamps from a similar source. Both circuits had a 4 percent increase in power factor over a similar circuit using only a power capacitor.

In the past a capacitor was placed across the lead secondary winding alone in order to tune the lead circuit to a harmonic which occurred in the lead circuit, but this had little or no positive effect on the power factor of the circuit. Furthermore, a separate capacitor was connected across the input in order to increase the power factor to above 90 percent. By placing a single capacitor across the lead primary winding and lead secondary winding both purposes are achieved, i.e., the power factor is corrected to above 90 percent and the lead circuit is tuned to a selected harmonic.

In operation input voltage to the ballast is applied to terminals 1 and 2 connected across lead primary winding $P_1$ and lag primary winding $P_2$. Input current through the lag primary winding $P_2$ induces a voltage in the lag secondary winding $S_2$. The combined voltage across the primary winding $P_2$ and secondary winding $S_2$ turns on the lag lamp $L_2$. Input current through the lead primary winding induces a voltage in the lead secondary winding $S_1$. The lead lamp comes on when its turn on voltage is reached and it then conducts current. Thereafter, current from secondary windings $S_1$ is divided between a circuit branch comprising power capacitor $C_1$ connected in series to the lead lamp $L_1$ and a circuit comprising shunt capacitor $C_2$. Current through the lead lamp is said to lead the input voltage because of the power capacitor. If the shunt capacitor is not used the power factor of the circuit is below 90 percent.

A circuit as set forth in FIG. 1 has been built and operated with components having the following values:

| | |
|---|---|
| Primary winding $P_1$ | 304 turns |
| Primary winding $P_2$ | 266 turns |
| Secondary winding $S_1$ | 400 turns |
| Secondary winding $S_2$ | 336 turns |
| Lamp $L_1$ | 400 watt mercury |
| Lamp $L_2$ | 400 watt mercury |
| Capacitor $C_1$ | 31.8 MFD |
| Capacitor $C_2$ | 4 MFD |

Figure 2:
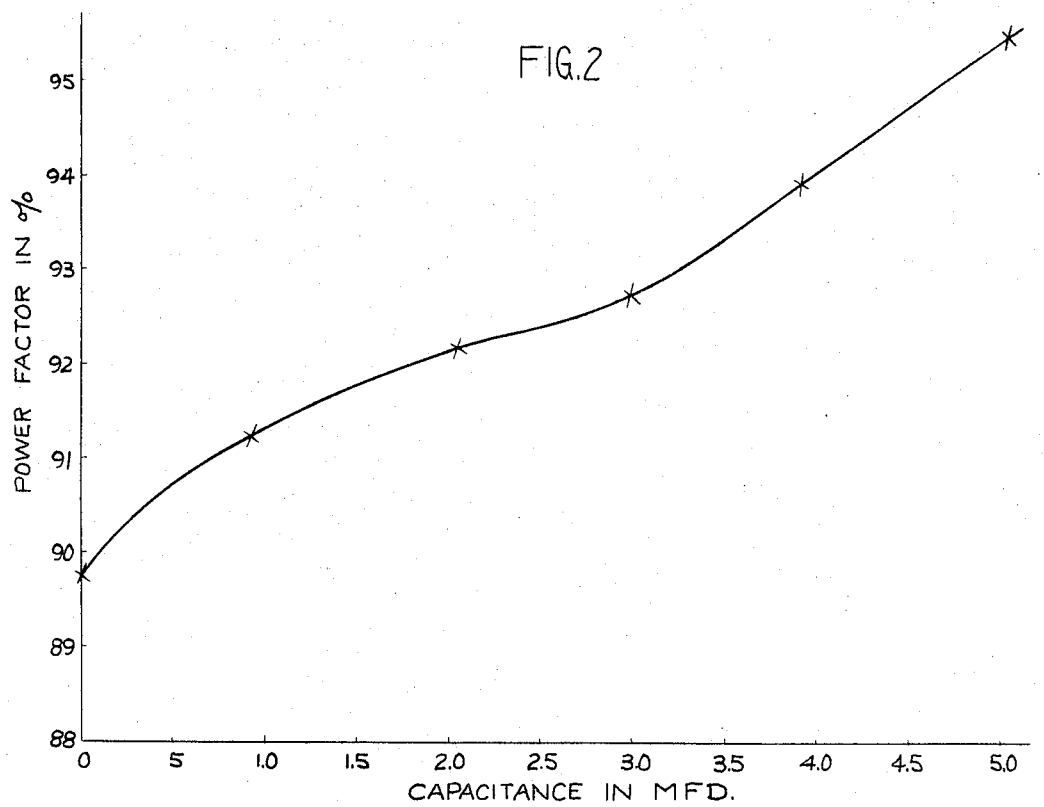
FIG. 2 is a diagramatical showing of the relationship of the shunt capacitor to the power factor of the circuit shown in FIG. 1.

A better understanding of the relationship of the shunt capacitor to the rest of the circuit may be had by referring to the graph shown in FIG. 2. FIG. 2 shows the relationship between shunt capacitance expressed in microfarads, and input power factor, expressed in percentage. As can be seen by using no shunt capacitor across lead primary winding $P_1$ and lead secondary winding $S_1$, power factor is below 89 percent. By placing a four microfarad capacitor across the lead primary winding and lead secondary winding power factor has been improved to above 93 percent. This shunt capacitor, therefore, acts to bring the voltage and current into a closer phase relationship, i.e., the cosine of the angle between the two varies as the value of shunt capacitance is changed. Furthermore, this shunt capacitor is used to tune the lead circuit to an odd harmonic. That is the lead circuit is tuned to exhibit a low impedance to current at the selected harmonic frequency.

Figure 3:
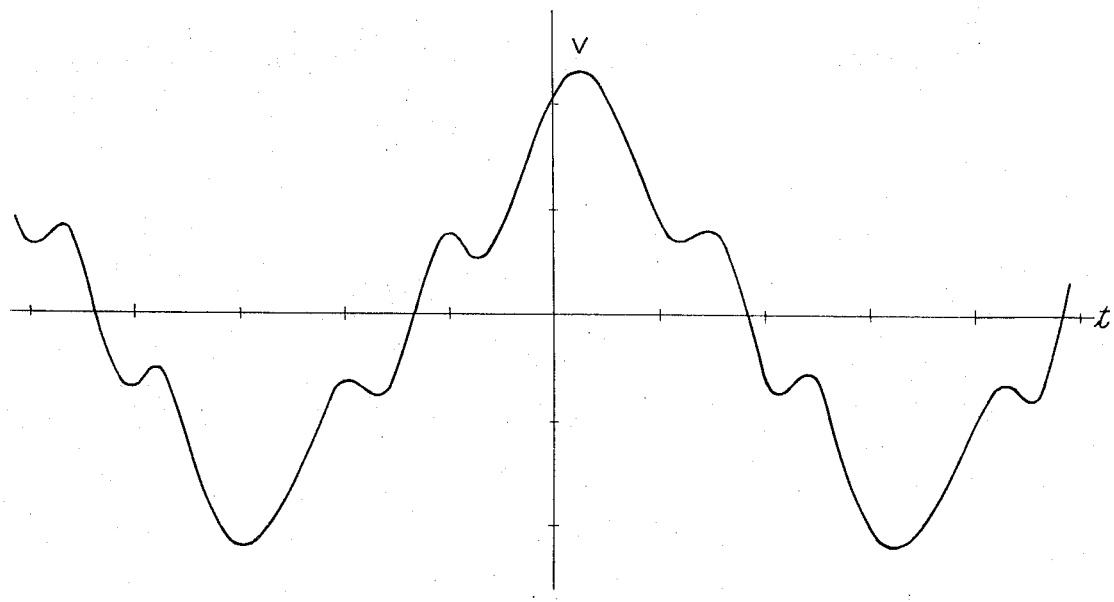
FIG. 3 is a diagramatical showing of the waveform of the open circuit voltage of the lead lamp loop of the circuit shown in FIG. 1.
Figure 4:
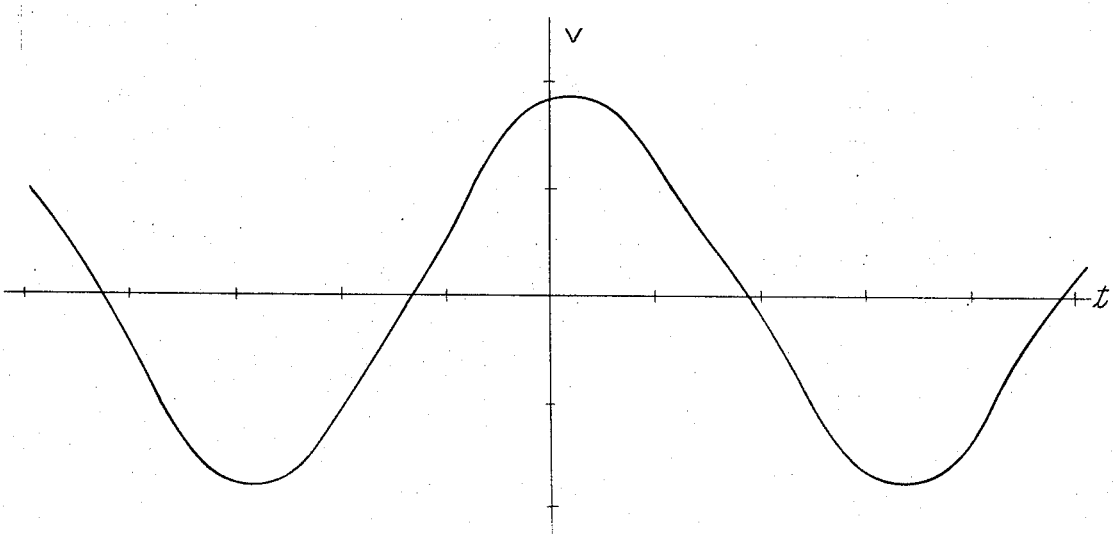
FIG. 4 is a diagramatical showing of the waveform of the open circuit voltage of the lag lamp loop of the circuit shown in FIG. 1.

A better understanding of the harmonic situation may be had by referring to the graphs of the wave forms in FIGS. 3 and 4. FIG. 3 shows the open circuit voltage of lead lamp $L_1$ with the value of $C_2$ being 4 mfd. The exemplification circuit which was built was tuned to the fifth harmonic. FIG. 4 shows the open circuit voltage of the lag circuit where no harmonics are present to be tuned. By comparing FIGS. 3 to 4 it is noticed that the open circuit voltage of the lead lamp is substantially higher than the lag lamp. This results from tuning the lead circuit to the fifth harmonic. A fewer number of lead secondary winding turns are needed to start a lamp in a tuned circuit as opposed to an untuned circuit.

From the foregoing description of the exemplification of the invention, it will be apparent that many modifications may be made therein. It will be understood, therefore, that this embodiment is intended as an exemplification of the invention only and that the invention is not limited thereto. It is to be understood, therefore, that it is intended in the appended claims to cover all such modifications as fall within the true scope of the invention.

What I claim as new and desire to secure by Letters Patent of the United States is:

1. A lead-lag ballast circuit comprising:
   a lead primary winding and a lead secondary winding wound on a first magnetic core;
   a lag primary winding and a lag secondary winding wound on a second magnetic core;
   a power capacitor;
   said lead primary winding, said lead secondary winding said power capacitor being connected in a series circuit relationship for operation of a first lamp;
   a shunt capacitor connected in parallel with said lead primary winding and said lead secondary winding;
   and said lag primary winding and said lag secondary winding being connected in a series circuit relationship for operation of a second lamp.

2. A lead-lag ballast circuit comprising:
   a lead circuit, including a lead primary winding and a lead secondary winding, for operating a first lamp;
   power factor correction means connected across said lead primary and secondary windings for increasing the power factor of said lead circuit; and a lag circuit, including a lag primary winding and a lag secondary winding, for operating a second lamp; whereby power factor is increased in the ballast circuit.

3. A ballast circuit as set forth in claim 2 wherein said lead circuit further includes a power capacitor connected in series with said lead primary and secondary windings; and said power factor correction means includes a shunt capacitor having one side connected to the junction of said lead secondary winding and said power capacitor, and the other side connected to said lead primary winding.

4. A ballast circuit as set forth in claim 3 wherein said shunt capacitor is of a value so as to tune said lead circuit to a selected harmonic.

5. A lead-lag ballast circuit comprising:
   a lead primary winding and a lead secondary winding connected in series;
   a lag primary winding and a lag secondary winding connected in series;
   a power capacitor connected to the end of said lead secondary winding remote from said lead primary winding; a shunt capacitor connected to said power capacitor and to the end of said lead primary winding remote from said lead secondary winding whereby power factor is substantially improved.

* * * * *